UNITED STATES PATENT OFFICE.

BENJAMIN T. BROOKS, OF BAYSIDE, NEW YORK, ASSIGNOR OF ONE-HALF TO THE VISCOLOID CO., OF LEOMINSTER, MASSACHUSETTS, A CORPORATION OF MASSACHUSETTS, AND ONE-HALF TO THE FIBERLOID CORPORATION, OF INDIAN ORCHARD, MASSACHUSETTS, A CORPORATION OF MASSACHUSETTS.

PROCESS FOR THE MANUFACTURE OF BORNEOLS AND CAMPHENE.

1,426,036.　　　　　Specification of Letters Patent.　　Patented Aug. 15, 1922.

No Drawing.　　Application filed April 6, 1920. Serial No. 371,751.

*To all whom it may concern:*

Be it known that I, BENJAMIN T. BROOKS, a citizen of the United States, residing at Bayside, Long Island, in the county of Queens and State of New York, have invented certain new and useful Improvements in Processes for the Manufacture of Borneols and Camphene, of which the following is a specification.

It is well known that borneol and isoborneol may be readily converted into camphor by oxidation in a variety of ways. The object of the present invention is to provide a simple and economical process for the manufacture of borneol and isoborneol, together with camphene, which latter is readily convertible into borneol or isoborneol.

In the practical operation of the process no distinction is drawn between borneol and isoborneol, inasmuch as the structural differences, if any, are not practically important and both yield camphor on oxidation, and may therefore be regarded as equivalents for this purpose. The term "camphene" is used to include a hydrocarbon mixture consisting chiefly of that hydrocarbon (melting when pure at about 50° C.) whose formula may be represented as $C_{10}H_{16}$ and which is readily converted into borneol acetate or isoborneol acetate by treating with glacial acetic acid and a little sulfuric acid at ordinary temperatures. It will be understood, however, that this hydrocarbon mixture may also contain lesser quantities of the isomeric hydrocarbon bornylene; but since bornylene is also convertible into bornyl acetate, and since the structural differences between bornylene and camphene have not been definitely established, the hydrocarbon mixture containing both camphene and bornylene will be designated herein as "camphene."

It is further well known that camphene may be prepared by the decomposition of the so-called pinene hydrochlorid, or bornyl chlorid, the substance melting at about 131° C. and formerly commonly but incorrectly termed "artificial camphor." It is also well known that bornyl chlorid is formed when dry gaseous hydrochlorid acid is passed into cool dry turpentine or pinene. This reaction always yields a mixture of the crystalline bornyl chlorid with certain oily products, the nature of which is not accurately known. The presence of moisture leads to the formation of increased proportions of these oily products.

The oily product is readily separated from the crystalline bornyl chlorid in a variety of ways, as for example by a filter press, a vacuum filter, a centrifugal extractor or the like. Little is definitely known as to its nature, but it has been supposed to consist largely of dipentene dihydrochlorid, together with other substances of obscure nature, such for example as fenchyl chlorid, camphene hydrochlorid, terpinene hydrochlorid, etc. The crystalline bornyl chlorid is usually obtained by chilling the original reaction mixture to about $-15°$ C. and separating the crystals as indicated above: the crystalline product thus recovered may then be converted into crude camphene by heating with alkali, alkali phenolates, or other well known procedure.

The present invention is based on the discovery that the oily product mentioned above even after separation of all crystallizable matters by cooling to low temperatures, contains a substance or substances which yield borneols and camphene when heated with sodium acetate in glacial acetic acid solution, or with equivalent mixtures containing a fatty acid and a fatty acid salt. The substance or substances capable of reacting as above have not as yet been positively identified; but inasmuch as the oily chlorids are ordinarily regarded as waste products in the manufacture of crystallizable bornyl chlorid, and as by the present process I am able to secure therefrom a substantial yield of borneols, it will be clear that the present invention is technically and economically of great importance.

The yield of borneols from these oily chlorids, under the treatment as above outlined, is so high that it is not necessary in practice to separate the crystalline bornyl chlorid from the oily substance in a preliminary operation; but the entire mixture of substances formed by treating dry turpentine or pinene in the cold with dry gaseous hydrochloric acid may be employed directly for the manufacture of borneols. This procedure greatly simplifies the operation, since the manufacture of borneols as at present practiced is greatly complicated by the necessity for freezing the reaction mixture, and the subsequent removal of the oily chlorids by filter-pressing or by centrifugal separation is both costly and troublesome. However, my invention is not limited in this respect: for example, the crystalline bornyl chlorid may be separated in the usual way and employed for purposes other than the manufacture of borneols or camphene; or by virtue of its crystalline character it may conveniently be stored for subsequent manufacture into borneols or other products as may be desired, the oily mixture being treated separately.

The following examples disclose certain preferred embodiments of the process, it being understood that the invention is not limited to the particular manipulations, temperature conditions, or other operating details described therein.

*Example I.*—Turpentine, or other oil containing pinene as a major component, is carefully dried and preferably treated in such manner as to remove all substances other than pinene, more particularly alcoholic substances capable of yielding water on treating with hydrochloric acid gas. This may be accomplished in any suitable manner, as for example by fractional distillation, by treatment with reagents capable of removing the undesired constituents, or by any combination of such methods. The purified pinene or turpentine is then treated with dry gaseous hydrochloric acid in any apparatus capable of withstanding the action of hydrochloric acid, the mixture being cooled during the introduction of the gas. In the preferred method of carrying out the process the temperature of the reaction mixture is maintained at about 0–5° C. The completion of the reaction is indicated by the non-absorption of the hydrochloric acid and by the separation of crystalline bornyl chlorid.

The entire reaction mixture prepared as above may then be dissolved in glacial acetic acid, preferably about two volumes, together with sufficient fused anhydrous sodium acetate to react with all of the organic chlorids present. In the preferred method of practicing the invention I employ for each 100 kilos of the crude chlorid mixture, approximately 200 to 250 liters of glacial acetic acid and approximately 55 kilos of fused sodium acetate, the latter quantity being somewhat in excess of the theoretical requirement.

This mixture is then heated to 160–200° C. for four to eight hours, excellent results being obtained by heating at 180° C. for five hours. This operation is performed in any apparatus of the autoclave type which is capable of withstanding the internal pressures developed (which at 180° C. may reach 225 lbs. per sq. in.) and capable also of withstanding the corrosive action of acetic acid at these temperatures. Glass-enameled ware, silver or copper have proven sufficiently resistant.

After cooling, the contents of the autoclave are removed and the salt formed is filtered off, the acetic acid and bornyl acetate being then separated by fractional distillation. The crude camphene passes over with the acetic acid fraction, and may be converted into bornyl acetate; or it may be separated from the acetic acid by addition of a small quantity of water and oxidized directly to camphor, or otherwise utilized as may be desired, it being found that the impurities present are negligible for practical purposes. In the preferred method of carrying out the invention the crude camphene is converted into bornyl or isobornyl acetate, which product is added to the portion of bornyl acetate obtained by the fractional distillation of the mixture resulting from the autoclave treatment. On saponifying this crude bornyl acetate, I obtain a mixture of borneol and isoborneol, together with a relatively small quantity of oil.

In a typical operation performed as above a quantity of dried turpentine gave a yield of borneol equivalent to 76% of the theoretical quantity obtainable from pure pinene. There was obtained in addition about 11% of an oily material composed chiefly of terpineol, but containing some dissolved borneol, most of which could be recovered by freezing the mixture at about −15° C. Or if desired other methods may be employed for the separation of borneol and terpineol from this mixture.

*Example II.*—In another operation, the crude mixture of chlorids derived from the hydrochloric acid treatment was chilled and filtered. 800 parts by weight of the oily filtrate were then heated in an autoclave with 1600 parts by weight of glacial acetic acid and 700 parts by weight of anhydrous sodium acetate, the mixture being heated to 180° C. for five hours. Upon treating the reaction mixture as described above approximately 250 parts by weight of crystalline borneol and isoborneol were obtained.

The acetic acid employed as above performs a variety of functions in addition to esterifying the camphene in the second step of the process. In particular it serves as an excellent solvent both for the organic chlorids and for the alkali salt. It may be replaced by other bodies capable of performing these same solvent functions, and in particular by other fatty acids, especially those of low molecular weight as formic, propionic and butyric acids. In case of such replacement the corresponding alkali salt (formate, propionate, butyrate, etc.) may be used.

I claim:

1. In a process of making borneols and camphene, the step which consists in reacting upon the mother liquor, obtained by reacting upon pinene with dry hydrochloric acid and separating crystallizable bornyl chlorid from the reaction mixture, with a fatty acid in presence of a fatty acid salt of an alkali metal for the preparation of a bornyl ester and camphene.

2. In a process of making borneols and camphene, the step which consists in reacting upon the mother liquor, obtained by treating pinene with dry hydrochloric acid and separating crystallizable bornyl chlorid from the reaction mixture, with a fatty acid in presence of a fatty acid salt of an alkali metal under pressure at a temperature of 160–200° C. for the preparation of a bornyl ester and camphene.

In testimony whereof, I affix my signature.

BENJAMIN T. BROOKS.